J. DAIN.
SIDE DELIVERY ROTARY RAKE.
APPLICATION FILED OCT. 28, 1912.
1,120,288.
Patented Dec. 8, 1914.
3 SHEETS—SHEET 2.
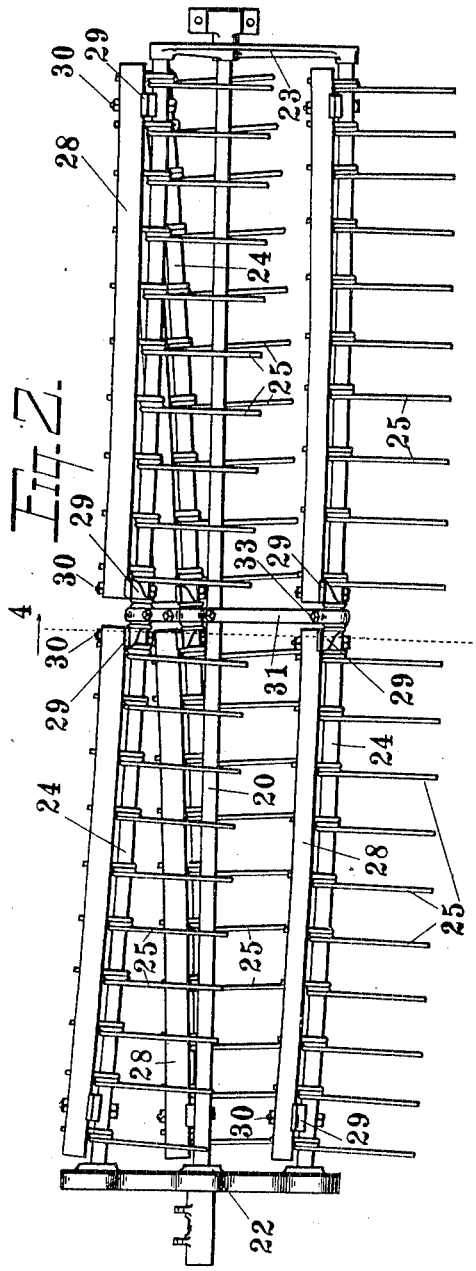
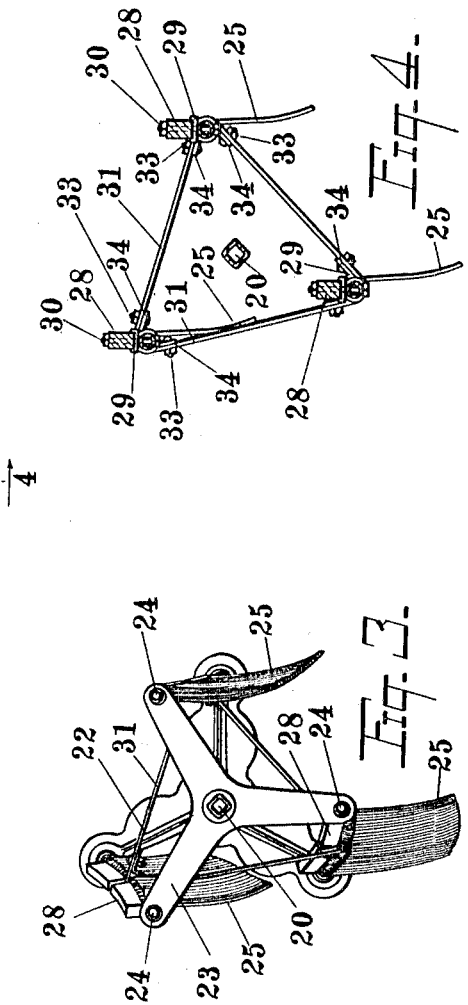
Witnesses:
Rophene Freeman
W. A. Furner
Inventor:
Joseph Dain.
by Adams & Jackson
Attorneys.

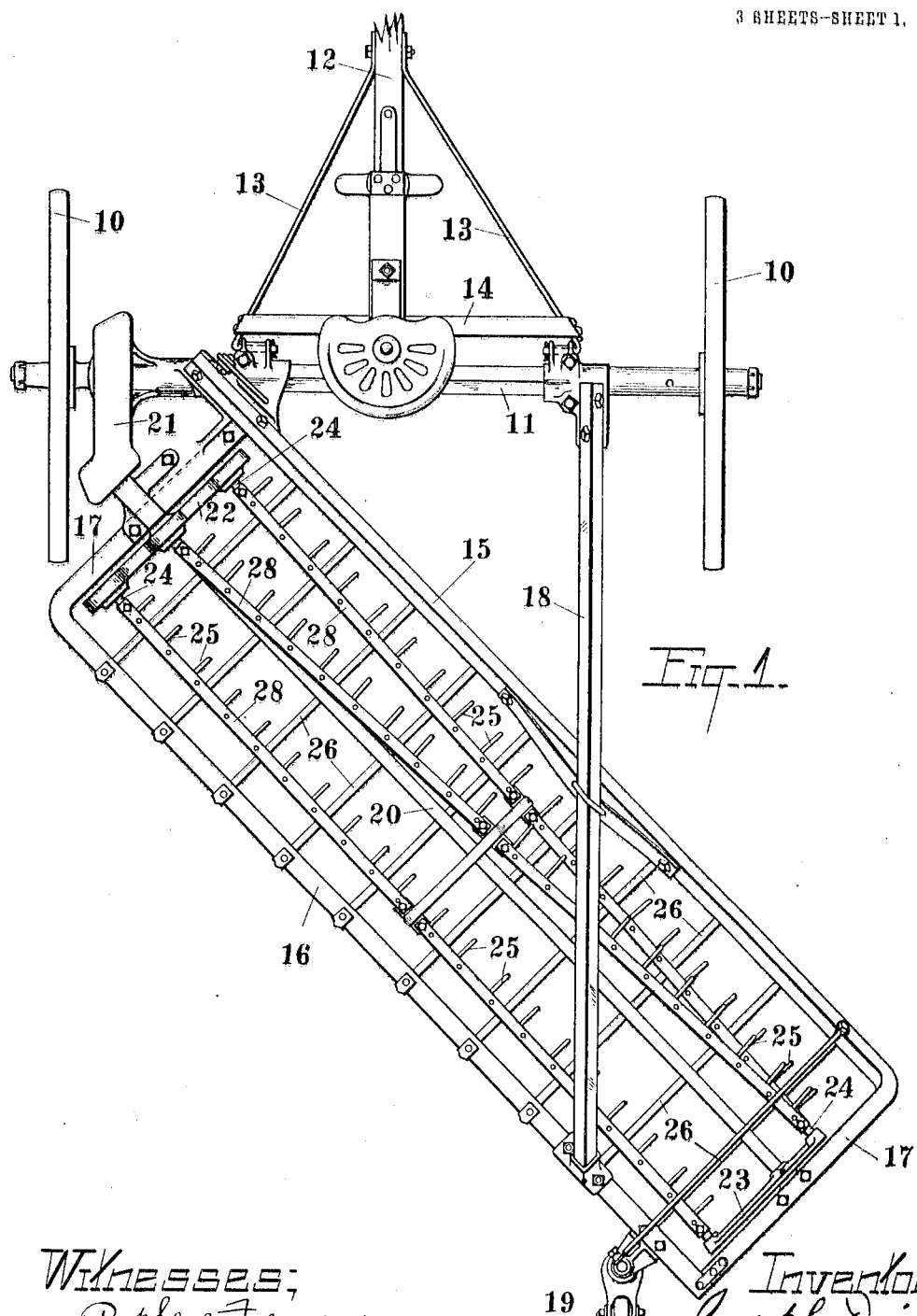

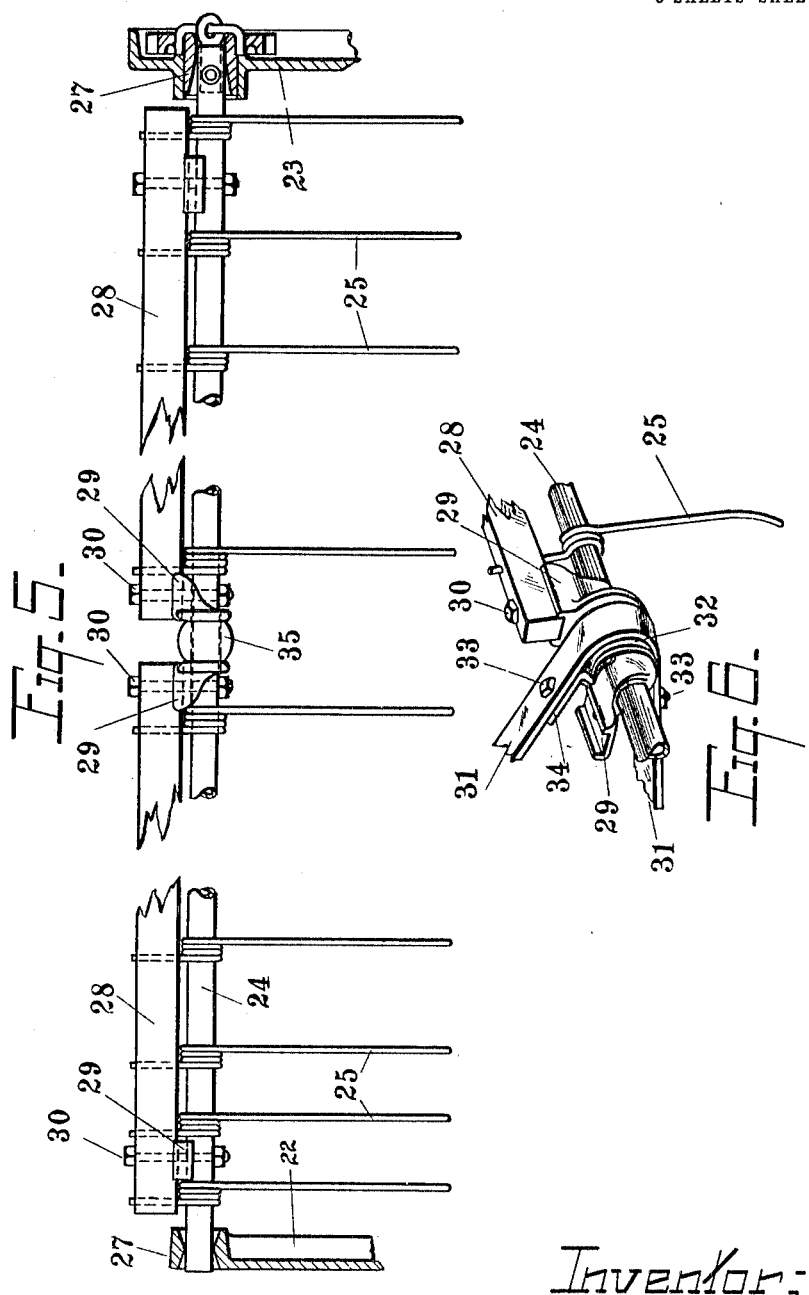

UNITED STATES PATENT OFFICE.

JOSEPH DAIN, OF OTTUMWA, IOWA, ASSIGNOR TO DAIN MANUFACTURING COMPANY OF IOWA, OF OTTUMWA, IOWA, A CORPORATION OF IOWA.

SIDE-DELIVERY ROTARY RAKE.

1,120,288. Specification of Letters Patent. Patented Dec. 8, 1914.

Application filed October 28, 1912. Serial No. 728,168.

*To all whom it may concern:*

Be it known that I, JOSEPH DAIN, a citizen of the United States, residing at Ottumwa, in the county of Wapello, in the State of Iowa, have invented certain new and useful Improvements in Side-Delivery Rotary Rakes, of which the following is a specification, reference being had to the accompanying drawings.

My invention relates to improvements in side-delivery rotary rakes, and has particularly to do with the reel thereof, being in other respects very similar in construction to the rake shown and described in Letters Patent No. 886,681, dated May 5, 1908, granted to me. As shown in said patent and as generally constructed in rakes of this same general class, the reel, by which is meant the rotating teeth-carrying frame, has been so constructed that the cross-bars which carry the teeth are so connected to the inner and outer rotating heads that they are at all times parallel with respect to each other and, of course, parallel to the front and rear bars of the frame in which the reel is mounted. Such arrangement of the teeth-carrying bars necessarily causes all the teeth on each bar to be brought into and withdrawn from operative engagement with the hay being windrowed at exactly the same time, with the possible exception of course that the teeth at the outer end of the bar will continue in engagement with the hay momentarily longer by reason of encountering at that end a larger mass or accumulation of hay. With a reel so constructed the result has been that the working strains have been irregular and the work has been performed in what may be described as a rapid succession of jerks.

The leading object of my invention is to provide a construction of reel that will obviate this disadvantageous way of operating and permit the working strains to be more constant and regular with the resulting advantage also of providing a more even and uniform draft of the rake. Briefly stated, I accomplish this object by so mounting the teeth-carrying bars in their oppositely-located rotating heads that such bars will not, as heretofore, be parallel with each other and with the axis of the reel-heads, but will be so secured in place as to be permanently held out of parallelism with the said axis, and be so diagonally arranged with respect to each other as to be effective upon the hay as if they were in fact spirally arranged around the axis of the reel. Stated in another way the arrangement of these teeth-carrying bars is such as would be produced if they were properly secured in place in their heads so as to be parallel with each other and one head was then held stationary while the other head was given a partial rotation and then locked against rotation.

Other objects of the invention are to provide a novel shape for each of such bars whereby they are better adapted to properly present the teeth to the hay being raked when they are arranged in the diagonal manner referred to; and generally to improve the construction and operation of machines of this character—all as hereinafter more specifically described.

That which I believe to be new will be pointed out in the claims.

In the drawings,—Figure 1 is a top or plan view of a side-delivery rake embodying my improvements; Fig. 2 is a detailed view showing in elevation my improved reel; Fig. 3 is a detail being an end view of the reel; Fig. 4 is a vertical section taken at line 4—4 of Fig. 2; Fig. 5 is a view partly broken away of one of the teeth-carrying bars and showing in vertical section the bearings for the ends of the bars; and Fig. 6 is a detail, being a perspective view illustrating the manner of attaching the center brace that connects the several bars of the reel together.

Referring to the several figures of the drawings, in which corresponding parts are indicated by like reference characters, 10 indicates a pair of carrying wheels which are journaled upon an axle 11.

12 indicates a tongue laterally supported by braces 13.

14 indicates a cross-bar secured in front of the axle and extending across the base of the tongue 12.

15—16 indicate the front and rear bars, respectively, and 17 the end bars of the reel-frame, which is diagonally arranged behind the axle of the machine.

18 indicates a beam suitably connected at its front end with the axle 11 and extending back over and across the reel-frame to the rear bar of whch it is to be suitably attached. Near the rearmost corner of the reel-frame is provided a supporting caster-wheel 19.

All of the parts so far described are old and well-known, and furthermore are described in detail in my said Letters Patent 886,681, and hence it is believed it is unnecessary to further here describe them.

20 indicates a shaft extending longitudinally and centrally across the reel supporting frame and journaled at its outer end in one of the end bars of such frame, and at its other end may be journaled in a suitable slide-box, as described in my said former patent. It is adapted to be driven through suitable gearing, not shown, from the axle 11, as described in my said patent, such gearing being inclosed in the box marked 21. Adjacent to the inner faces of the end bars 17 of the frame, and suitably secured upon the shaft 20, are two heads 22 and 23, which, with the longitudinal bars hereinafter described and which carry the rake teeth, constitute the reel. These heads may be in the form of spiders and the one nearer to the axle would be provided with a suitable arrangement of gears, as in my said former patent, to maintain the rake teeth always in vertical position as they are being rotated around the shaft 20. I do not, however, wish to confine myself to the specific gearing illustrated in said patent. The teeth-carrying bars hereinbefore referred to, and which, with the said heads 22—23, constitute the reel, are indicated by 24. As shown they are three in number, which number has been found in practice to perform satisfactory service, but it is evident that this number may be varied without departing from the spirit of my invention. Each of these teeth-carrying bars is journaled at its ends in the heads 22—23, and the bars are so arranged in said heads, as clearly shown in Figs. 1, 2 and 3, as to be permanently held out of parallelism with the axis of the reel - heads, which, in the construction shown, is the same as the axis of the shaft 20. In other words, they are each given such an inclination from a position parallel to the axis of the heads as would be produced if they were first arranged in the heads parallel to the said axis and then one of said heads held while the other was partially rotated. Such inclination as is thus given to each bar tends necessarily to bring the central portion of each bar nearer to the shaft 20 than are the ends of the bar, and to compensate for what would therefore be a slightly smaller diameter of the reel near its central portion I give to each bar a slight sag or departure from a horizontal plane from its ends toward the center and by doing so cause all of the teeth carried by the bar to approach the ground evenly and practically together so that the hay may be raked cleanly over the full extent of ground covered by the bar and properly windrowed. The extent to which each bar should be so sagged from its ends toward the center would depend upon the degree to which its end journals were out of line with each other. By the inclined arrangement of the bars, due to the bearings for each end being out of alinement with each other as described, the work of the machine will be accomplished more smoothly and easily for the raking operation will be performed much as if the rake teeth were carried by bars of truly-spiral form,—that is, there will be a more nearly constant engagement of the rake-teeth with the hay on the ground than where the bars are parallel as in former constructions such as exemplified in my said Letters Patent. The rake-teeth on the several bars 24 are indicated by 25, and 26 indicates semi-circular guards extending across the reel-frame that will act to free the teeth 25 from any hay that may become attached thereto.

In view of the constantly changing angle of the series of teeth as the reel rotates it is very desirable that bearings for the ends of the bars 24 be provided that will permit a free motion in any direction of the bars, and such bearings are shown at 27 in Fig. 5.

28 indicates beams lying over the teeth-carrying bars 24 and suitably secured one to each of such bars through the intervention of blocks 29 resting on the bars and bolts 30 passing through the said bars, blocks and beams. Through these beams the upper ends of the teeth 25 are passed for securing the teeth in position. Each beam 28 is divided into two parts, as clearly shown in Figs. 2 and 5, and the inner ends of these parts are separated a short distance to afford a space through which passes a brace 31 that connects the several teeth-carrying bars 24 together. The brace comprises, in the construction shown, a three-sided or triangular-shaped piece, and at each of its angles it is provided with a socket-bearing 32 that is held to the brace by bolts 33 that pass through the brace and through short brackets 34 that project from the bearing 32 and lie against the under faces of two of the arms of the brace, as best shown in Fig. 6. These brace-supporting brackets 34 are best formed integral with the socket-bearing 32.

Each socket-bearing 32 fits upon a spherical or ball-shaped bearing 35 secured to one of the teeth-carrying bars 24 and secured thereupon in any suitable manner. As shown, such bearings 35 are held between the intermediate blocks 29 that support the separated inner ends of the beam 28. By providing a freely movable or universal connection of the brace with each bar 24 these reel-bars are permitted the requisite freedom of motion during the rotation of the reel, and, together with the form of bearings 27 at the ends of the bars, or other equivalent forms, the reel as a whole is flexibly mounted and free to adapt itself to the constantly changing angles of the series of teeth as the reel rotates. Furthermore by uniting the several teeth-carrying bars together intermediate of their ends in the manner described they are effectively supported, and, by the flexibility of the reel as a whole, to which the said brace largely contributes, damage is prevented to the machine when the teeth encounter inequalities in the surface of the ground and other obstructions. It is evident that such would not be the case were the reel supported, as has heretofore been the case, by means of rigid connections extending to the reel-shaft.

What I claim as my invention and desire to secure by Letters Patent is,—

1. A side-delivery rake comprising in combination supporting-wheels, a reel-frame arranged diagonally to the line of draft, and a reel rotatably mounted in said frame, said reel comprising two heads and a plurality of teeth-carrying bars connecting said heads and arranged obliquely to the axis of the reel.

2. A side-delivery rake comprising in combination supporting-wheels, a reel-frame arranged diagonally to the line of draft, and a reel rotatably mounted in said frame, said reel comprising two heads and a plurality of teeth-carrying bars arranged out of paralelism with each other and connecting said heads.

3. A side-delivery rake comprising in combination supporting-wheels, a reel-frame arranged diagonally to the line of draft, and a reel rotatably mounted in said frame, said reel comprising two heads and a plurality of teeth-carrying bars arranged between the heads obliquely to the axis of the reel, each of said bars being sagged or bowed.

4. A side-delivery rake comprising in combination supporting-wheels, a reel-frame arranged diagonally to the line of draft, and a reel rotatably mounted in said frame, said reel comprising two heads and a plurality of teeth-carrying bars arranged between the heads obliquely to the axis of the reel and loosely journaled in said heads.

5. A side-delivery rake comprising in combination supporting-wheels, a reel-frame arranged diagonally to the line of draft, and a reel rotatably mounted in said frame, said reel comprising two heads and a plurality of teeth-carrying bars arranged between the heads obliquely to the axis of the reel and loosely journaled in said heads, each of said bars being sagged or bowed.

6. A reel for hay-rakes comprising in combination two heads and a plurality of teeth-carrying bars set obliquely to the axis of the reel and arranged between and loosely journaled in said heads and a brace connecting the several bars intermediate their ends.

7. A reel for hay-rakes comprising in combination two heads, a plurality of teeth-carrying bars set obliquely to the axis of the reel and arranged between and loosely journaled in said heads, and a brace connecting the several bars intermediate their ends, the connection between the brace and each bar, permitting a slight lateral movement of the bars.

8. A reel for hay-rakes comprising in combination two heads, a plurality of teeth-carrying bars set obliquely to the axis of the reel and arranged between and loosely journaled in said heads, a brace connecting the several bars intermediate their ends, and a ball-and-socket joint securing the brace to each bar.

9. A reel for hay-rakes comprising in combination two heads, a plurality of teeth-carrying bars set obliquely to the axis of the reel and arranged between and loosely journaled in said heads, a brace connecting the several bars intermediate their ends, a ball-and-socket joint securing the brace to each bar, and a bracket carried by one member of such joint adapted to support said brace.

10. A reel for hay-rakes comprising in combination two heads, a plurality of teeth-carrying bars set obliquely to the axis of the reel and arranged between and loosely journaled in said heads and that sag from their ends toward their centers, and a brace connecting the several bars intermediate their ends, the connection between the brace and each bar permitting a slight lateral movement of the bars as the reel is rotated.

11. A side-delivery rake comprising in combination supporting wheels, a reel-frame arranged diagonally to the line of draft and a reel rotatably mounted in said frame, said reel comprising two heads and a plurality of teeth-carrying bars, the said heads being provided with bearings for the ends of the bars, the bearings in one head being out of alinement with the bearings in the other head whereby the bars will rotate obliquely relative to the axis of the reel.

JOSEPH DAIN.

Witnesses:
W. G. DUFFIELD,
HARLAND E. RICH.